Dec. 1, 1925.
1,563,394
F. H. OWENS
MOTION PICTURE APPARATUS
Filed May 25, 1923
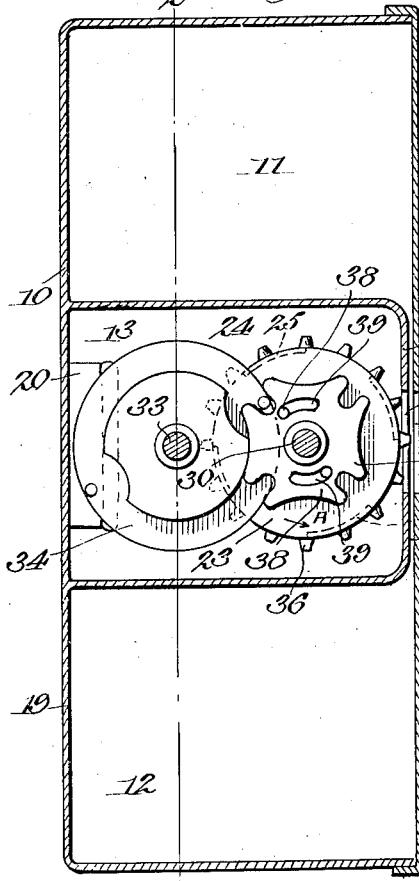
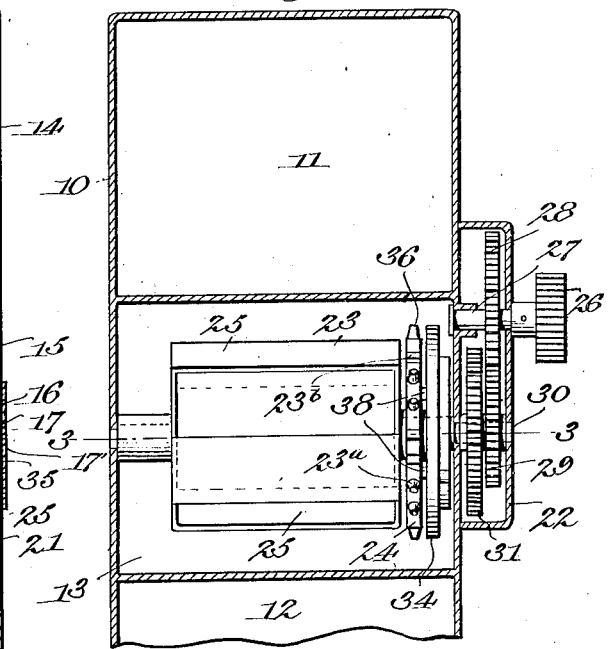
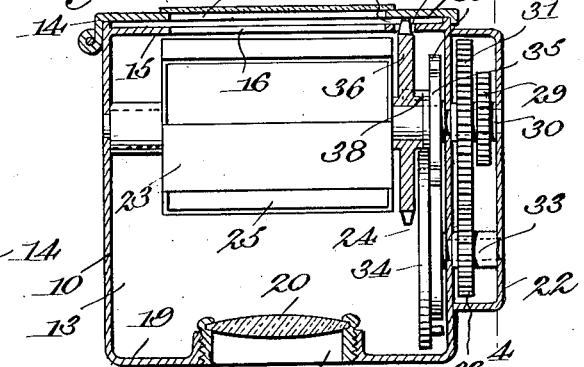
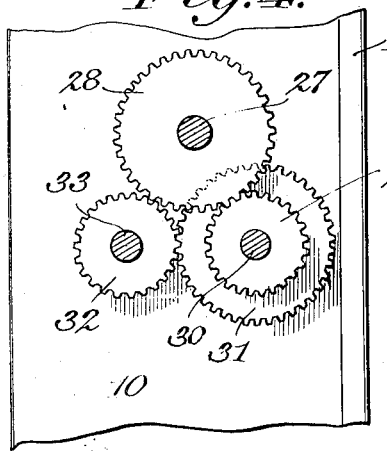
Freeman H. Owens,
INVENTOR
James A. G. Koehl
ATTORNEY Patented Dec. 1, 1925.

1,563,394

UNITED STATES PATENT OFFICE.

FREEMAN H. OWENS, OF NEW YORK, N. Y.

MOTION-PICTURE APPARATUS.

Application filed May 25, 1923. Serial No. 641,482.

*To all whom it may concern:*

Be it known that I, FREEMAN H. OWENS, a citizen of the United States, and resident of New York, in the county of New York and State of New York, have invented certain new and useful Improvements in Motion-Picture Apparatus, of which the following is a specification.

This invention relates to motion picture apparatus and relates more particularly to motion picture apparatus especially adapted for use with film having a plurality of series of images of which the images of one series are arranged in alternation with the images of another series.

A principal object of the invention comprehends the provision of motion picture apparatus adapted especially for use with film having plural rows of images embodying means for intermittently moving the film in either of opposite directions, said means being designed and constructed to expose one series of images when the film is moved in one direction and to expose the other series of images when the film is moved in the opposite direction.

More specifically, the principal object of the invention comprehends the provision of a motion picture apparatus for use with film having a plurality of series of images arranged in longitudinal alinement with the images of one series arranged in alternation with the images of the other series, embodying means operable for intermittently moving the film in one or the opposite direction two image spaces at a time to expose consecutively the images of one or the other image series, which means is operable to cause one image series to be exposed when the film is moved in one direction, and the other image series to be exposed when the film is moved in the opposite direction.

A still further object of the invention includes the production of a motion picture apparatus of this character which may be manufactured and sold economically, the apparatus being of simple construction and embodying operating instrumentalities which are positive of action and of such design as to permit the manufacture of motion picture apparatus in the form of toys.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a vertical section through the device.

Figure 2 is a section on the line 2—2 of Figure 1.

Figure 3 is a horizontal section on the line 3—3 of Figure 1.

Figure 4 is a section on the line 4—4 of Figure 3.

Figure 5 is a diagrammatic view showing the manner of dividing a standard width film to form two of my films.

Figure 6 is a plan view of a portion of the film ready for use in connection with the device.

In the drawings 10 represents a casing provided with an upper magazine 11, lower magazine 12 and intermediate compartment 13. The said casing carries a swinging closure 14 which may be opened to expose the magazines 11 and 12. The said intermediate compartment 13 has its wall 15 formed with an opening 16 disposed in alignment with an opening 17 in the closure 14 and an opening 18 in the wall 19 of said casing 10. Said opening 18 is equipped with a suitable lens 20. Said opening 17 is covered by a light diffusing screen 17'.

The wall 15 of the compartment 13 is arranged in parallel spaced relation to the closure 14 so as to define therewith a film guide or chute 21 to permit the film to be fed from one of said magazines to the other.

Located at one side of the casing 10 is a housing 22 and mounted therein is a power transferring mechanism for operating a revolving shutter 23 and intermittent means 24. Said means 24 and shutter 23 are mounted in the compartment 13 and said shutter is in horizontal alignment with the openings 16, 17 and 18. It is provided with spaced apart blades 25 and in the present instance four of such blades are employed. This shutter co-acts with the intermittent means 24 for the usual purpose well known in the art.

The power transferring mechanism of the housing 22 consists of a hand wheel 26 whose shaft 27 carries a large driving gear 28 in mesh with a small gear 29 on the shaft 30 of the barrel shutter 23. The shaft 30 carries a large gear 31 in mesh with a small gear 32 on the shaft 33 of the pin wheel 34 of the intermittent movement 24. As shown, the pin wheel co-acts with the star wheel 35. This star wheel 35 is loosely mounted on the shutter shaft 30 at one side of the film feeding sprocket 36 on said shutter shaft. The sprocket wheel 36 operates in a slot 37 in the wall 15 of the compartment 13 and same is adapted to co-act with the sprocket holes of the film shown in Figure 6. Said sprocket wheel carries lateral clutch pins 38, 38, which extend into the arcuate slots 39, 39, in one side of the star wheel 35. From this construction of the star wheel 35 and co-acting pins 38, 38 of the sprocket 36, it follows that when the pins are in the positions shown in Figure 1, the wheel 36 is being revolved in the direction opposite to that of the arrow (A) and that the film is being fed from the upper magazine 12 to the lower magazine 11. The intermittent mechanism is timed to cause intermittent registration and exposing of the alternate pictures of the film with the openings 16 and 17. By providing a slip clutch consisting of the slots 39, 39 and co-acting pins 38, 38, it will be seen that when the wheel 23 is revolved in an opposite direction, such as indicated by the arrow A, the intermittent mechanism is permitted to slip for a distance equal to one picture frame of the film.

The film shown at 40 is equal in proportion to exactly one-half the width of a standard film used in well-known forms of picture projecting apparatus and same has sprocket holes 41 along one of its marginal edges. The alternate pictures 1 and 2 are of the same series and are adapted to be successively exhibited when the film is moved in one direction. When the film is moved in an opposite direction, the alternate pictures 3, etc., of another series or subject are adapted to be successively exhibited. From the construction herein set forth, it will be understood that by turning the wheel 26 clockwise, one series of pictures upon the film 40 will be intermittently exhibited and upon turning the wheel contraclockwise, the alternate pictures or those of the next series of the film will be correspondingly exhibited.

41$^a$ illustrates what I term a standard width film. Pictures are formed on this film in the usual well-known manner but instead of each picture occupying the entire width of the film between the marginal sprocket openings, I form in each standard frame of the film four pictures and at each side of the center of the film the pictures are alternately of the same series and the others of an entirely different series or depicting a different subject. The sprocket openings of the pictures of one series are round to co-act with corresponding teeth 23$^a$ of the sprocket wheel 23. The holes of the other series are square and same co-act with squared teeth 23$^b$ of the wheel 23.

After the film shown in Figure 5 is developed in the usual manner, I cut the same medially by means of a revolving shearing wheel 42. In this manner, the film of normal standard size is divided equally to provide identical portions as shown in Figure 6.

The motion picture apparatus herein described is particularly designed to accommodate a film of short length and in order that this can be satisfactorily accomplished without the use of take-up reels, I take a short length of film and wind same into a tight coil and subject same while in this condition to the action of heat and then subject same to the action of a cooling temperature. This gives an added measure of resiliency to the strip and causes same to automatically coil upon itself when the strip is fed from one of said magazines to the other. By using a barrel shutter as shown at 23 in combination with the lens 20 the eye is focused on the picture at the opening 16 and the movement of the film is obliterated by the shutter 23 at diametrically opposite points upon the shutter to thereby lessen eye strain and flicker. It is desired that the lens be adjustably supported by a threaded lens mount 20$^a$. Also in this manner the pictures can be exhibited at a slow rate of speed while maintaining normal action, provided said pictures are photographed at the same rate of speed.

What is claimed as new is:

1. A motion picture apparatus for use with film having a plurality of series of images of which the images of one series are arranged in alternation with the images of the other series, comprising means operable for intermittently moving the film in one or the opposite direction to expose respectively the consecutive images of one or the other image series and mechanism for causing said means to function for exposing one image series when the means is operated in one direction and for exposing the other image series when the means is operated in the opposite direction.

2. A motion picture apparatus for use with film having a plurality of series of images arranged in longitudinal alinement with the images of one series arranged in alternation with the images of the other series, comprising means operable for intermittently moving the film in one or the opposite direction two image spaces at a time to expose respectively the consecutive images of one or the other image series, the said means including mechanism functioning for causing one image series to be exposed when the means is operated in one direction and the other image series to be exposed when the means is operated in the opposite direction.

3. A motion picture apparatus for use with film having a plurality of series of images of which the images of one series are arranged in alternation with the images of the other series, comprising means operable for intermittently moving the film in one or the opposite direction to expose respectively the consecutive images of one or the other image series and slip clutch mechanism for causing said means to function for exposing one image series when the means is operated in one direction and for exposing the other image series when the means is operated in the opposite direction.

4. A motion picture apparatus for use with film having a plurality of series of images arranged in longitudinal alinement with the images of one series arranged in alternation with the images of the other series, comprising Geneva gear means operable for intermittently moving the film in one or the opposite direction two image spaces at a time to expose respectively the consecutive images of one or the other image series and mechanism for causing said means to function for exposing one image series when the means is operated in one direction and for exposing the other image series when the means is operated in the opposite direction.

5. A motion picture apparatus for use with film having a plurality of series of images of which the images of one series are arranged in alternation with the images of the other series, comprising Geneva gear means including a pinwheel, starwheel and sprocket operable for intermittently moving the film in one or the opposite direction to expose respectively the consecutive images of one or the other image series and a pin and slot clutch connection between the starwheel and sprocket for causing said means to function for exposing one image series when the means is operated in one direction and for exposing the other image series when the means is operated in the opposite direction.

6. A motion picture apparatus comprising a casing having a frame opening, and an intermittent mechanism for successively moving a film in two directions respectively and for causing the alternate pictures of the film to be exhibited from the frame opening and including a star wheel, a coacting film sprocket, and a slip clutch between the sprocket and said star wheel, and thereby cause the latter and the former to revolve uniformly together in the same direction and intermittently display the alternate pictures of the film and move the latter in one direction and permit the said wheel and said sprocket to slip relatively for the distance of one frame of the film on initially operating the mechanism to move the film intermittently in an opposite direction.

Signed at New York, in the county of New York, and State of New York, this 19th day of May, A. D. 1923.

FREEMAN H. OWENS.